April 19, 1949.  R. D. ACTON  2,467,718
FERTILIZER SPREADER
Filed March 19, 1945  2 Sheets-Sheet 2
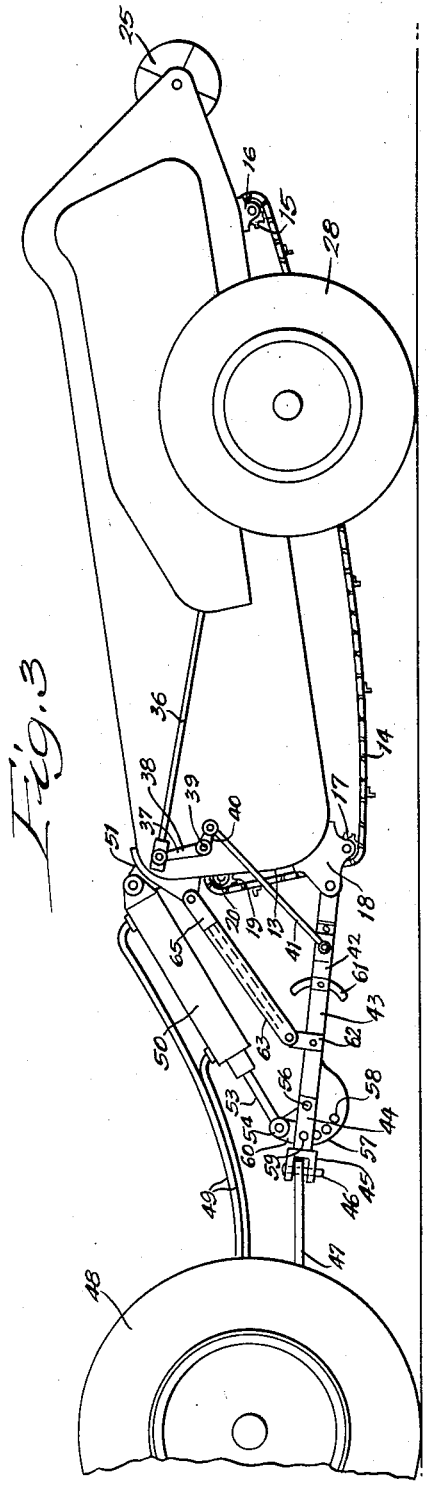
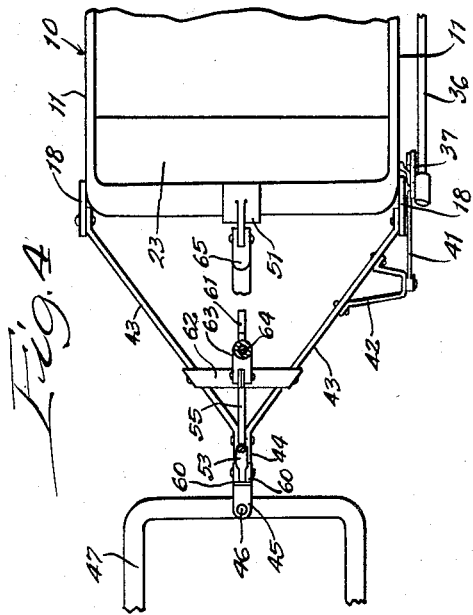
Inventor:
Russel D. Acton,
By Paul O. Pippel
Attorney.

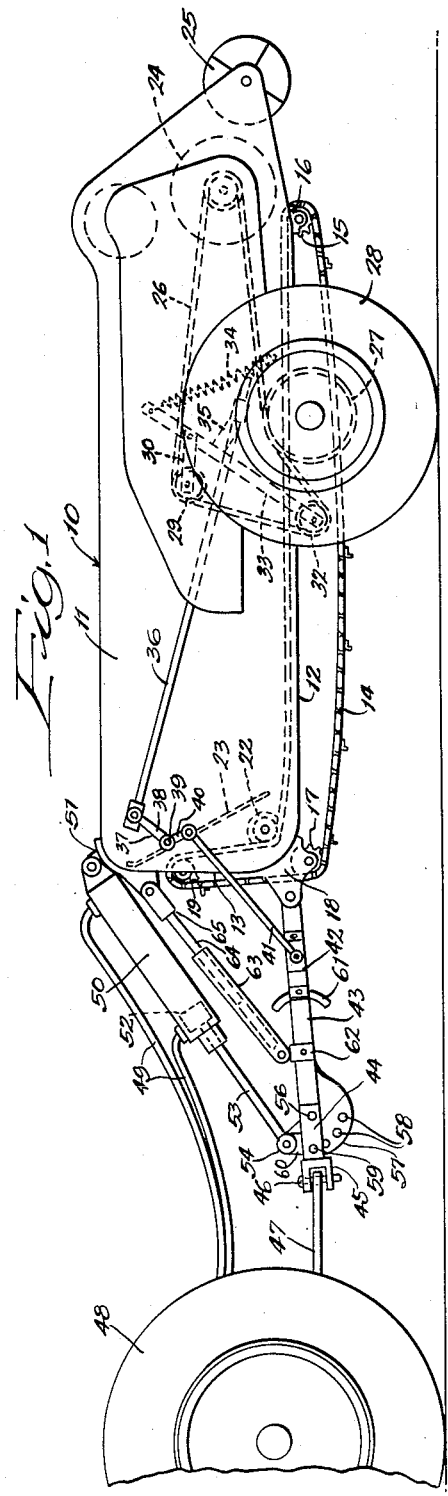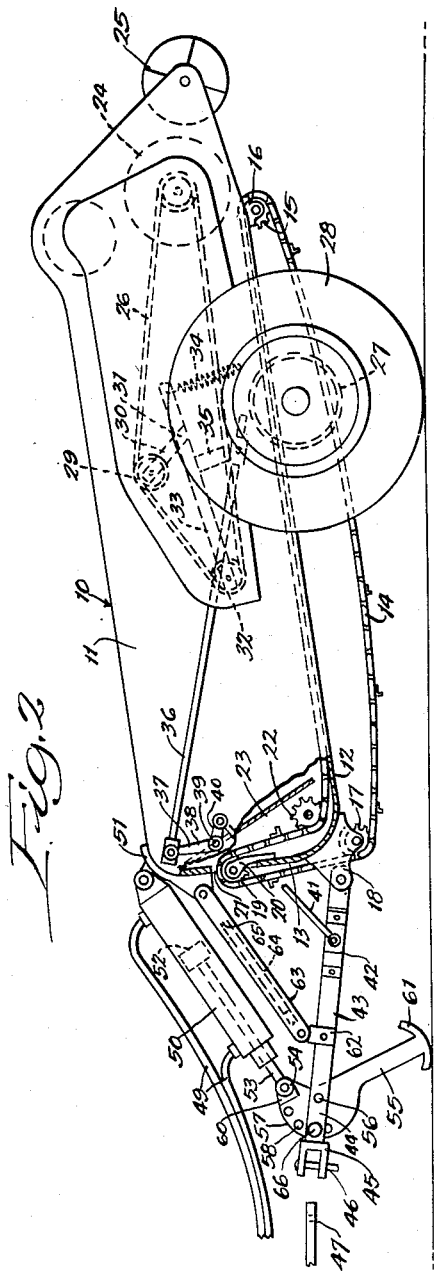

Patented Apr. 19, 1949

2,467,718

UNITED STATES PATENT OFFICE 2,467,718

FERTILIZER SPREADER

Russel D. Acton, Chicago, Ill., assignor to International Harvester Company, a corporation of New Jersey Application March 19, 1945, Serial No. 583,456

8 Claims. (Cl. 275—5)

This invention relates to a fertilizer spreader. More particularly, it relates to a liquid-handling attachment for a manure spreader. Most of the manure spreaders heretofore known and used have been adapted only for handling manure in solid form. Agriculturalists are now stressing the value of the liquid portion of the fertilizer which ordinarily is lost. It is therefore desirable to provide a spreader which will be able to retain and distribute the liquid portion of the fertilizer. The Griffiths Patent 2,360,125, October 10, 1944, discloses and claims a liquid-tight body for a fertilizer spreader constructed so that the liquid may be transported and spread in the field. In addition to the use of this type of spreader, there are many instances where farmers already have a conventional spreader and desire some means to utilize it for hauling and spreading liquid fertilizer or particularly fertilizer having a significant percentage of liquid which would be lost in a conventional spreader.

The principal object of the present invention is to provide a fertilizer spreader particularly designed to handle manure containing a substantial quantity of liquid.

Another principal object is to provide a manure spreader particularly adapted for operating in trailing relation with respect to a tractor and provided with a power-operated supporting strut. A subsidiary object is to provide a supporting strut construction by means of which a manure spreader having a liquid-tight front end may be tilted forwardly and supported in a position to retain liquid.

Another principal object is to provide a power-operated device for a tractor-operated spreader by means of which a spreader may be transported in tilted liquid-retaining position and elevated to a horizontal position for distributing material. A subsidiary object is to provide conveyor driving mechanism which is automatically thrown into operating position when the spreader is lifted into horizontal discharging position.

The above objects and others which will be apparent from the detailed description to follow are accomplished by a construction such as shown in the drawings, in which:

Figure 1 is a side elevation of a spreader incorporating the invention attached to a tractor;

Figure 2 shows the same spreader construction as Figure 1 in tractor-disengaging position with the supporting strut engaging the ground;

Figure 3 shows the same structure as Figure 1 with the spreader in tilted transport position with the strut lifted into folded position; and Figure 4 is a plan view of the front end of the spreader of Figure 1 showing the hitch construction with the tractor draw-bar.

In the drawings, the spreader illustrated has a conventional body designated in its entirety by the reference character 10. Said body has sides 11, a bottom 12, and a front end wall 13.

A conventional slat-type conveyor 14 extends over sprockets 15 mounted on brackets 16 at the rear of the spreader body. The return portion of the conveyor beneath the bottom of the body extends forwardly and over sprockets 17 carried by brackets 18 at the front end of the spreader. Said conveyor extends upwardly and over sprockets 19 mounted on brackets 20 carried by the front end wall 13 of the spreader body. Said sprockets 19 are mounted in a transverse opening 21 formed across the front end wall 13 at a location spaced a substantial distance above the bottom 12 to provide a liquid-retaining portion of the end wall which cooperates with the sides and bottom of the spreader body to form a liquid-tight compartment when the tractor body is tilted forwardly in the position illustrated in Figure 2.

From the sprockets 19 the conveyor extends substantially vertically downwardly within the body to sprockets 22 which are rotatably mounted on the side walls 11 of the spreader body. A deflecting wall or shield 23 extends rearwardly and downwardly within the spreader body from the top of the end wall 13 to protect the sprockets 19 and 22 from material loaded into the body. Said shield also assures satisfactory operation of the portion of the conveyor 14 extending between the sprockets 19 and 22. Beater structures 24 and 25 are indicated at the rear of the spreader body for distributing material delivered thereto by the conveyor 14 in a conventional manner.

For driving the conveyor and the other working parts of the spreader, a portion of a conventional chain drive and clutch mechanism has been illustrated. In Figure 2, a drive chain 26 adapted to engage a sprocket indicated by the dot-dash lines 27 concentric with a wheel 28 and adapted to be secured to and driven by said wheel is shown spaced from the drive sprocket 27. In Figure 1, said chain is shown in driving engagement with said sprocket. To accomplish this clutching action, a conventional mechanism as now in use on spreaders is illustrated to some extent. An idler sprocket 29 is mounted on a member 30 which is pivoted at 31 on the side wall 11 at one side of the spreader body. An idler sprocket 32 is mounted on a supporting member 33 rigidly connected to the member 30 for pivoting on the same axis. The chain-carrying structure includes in addition to the members 30 and 33 a spring 34 connected to an extended end of the member 35 and to the side wall of the spreader. Said spring acts to urge the chain-supporting structure into the position illustrated in Figure 2 in which drive is not transmitted from the sprocket 27 to the chain 26. Said structure additionally includes a lever arm 35 which is pivotally connected to a link 36. Said link extends forwardly and upwardly, being connected to one lever arm 37 of a bell crank member 38 pivotally mounted at 39 on one of the side walls 11 of the spreader body. Another arm 40 on said bell crank is connected to a forwardly and downwardly extending link 41. Said link, as best shown in Figure 4, is pivotally connected to a bracket 42. Said bracket is connected to one of a pair of forwardly extending draft members 43. Said members are pivotally connected to the brackets 18. The draft members extend together at their forward ends and are provided with spaced apart parallel portions 44 which are secured to a clevis 45. Said clevis is adapted to be connected by a pin 46 to a draw-bar 47. Said draw-bar is preferably carried by a tractor, one traction wheel 48 of which is illustrated. As is conventional, the tractor is preferably provided with means for supplying fluid under pressure through suitable hoses 49. Said hoses are shown as being connected to opposite ends of a cylinder 50. Said cylinder is pivotally connected at its upper end to a bracket 51 secured to the central upper portion of the front end of the spreader body.

A piston 52 within the cylinder 50 provides an extensible hydraulic device. Said piston is connected by a piston rod 53 with a stop portion 54 provided on a strut 55. Said strut member extends between the parallel portions 44 of the draft members 43 and is pivotally supported on said members by a transverse pin 56. The strut member has an arcuate portion 57 provided with a plurality of openings 58 which successively come into transversely alined openings 59 provided in the parallel portions 44. The stop portion 54 of said strut member is provided with lateral extensions 60 adapted to abut the upper portions of the parallel portions 44 of the draft members when the strut is lifted or folded into position as illustrated in Figures 1 and 3. In that position the strut is in substantially horizontal position with a supporting foot 61 lifted into position between the draft members 43.

An extensible stop device is provided between the bracket 51 at the upper end of the front wall 13 of the spreader body and a bracket 62 extending across the forward ends of the draft members 43. Said extensible device includes the hollow sleeve-like member 63 pivoted at its lower end to the bracket 62 and a rod-like member 64 pivoted at its upper end to the bracket 51. A shoulder 65 on the rod-like member is adapted to abut the sleeve-like member 64 to limit forward tilting of the spreader body to the position shown in Figure 3. In this position the spreader body is tilted so that the rear end of the bottom is on substantially the same level as the lower edge of the opening 21 whereby the body has a maximum liquid-retaining capacity in this position.

There are two different methods of operation of the manure spreader as above described. An operator may unhitch the spreader and locate it in a standby position as shown in Figure 2 at a location accessible to the material to be loaded. In this position the foot 61 of the supporting strut 55 engages the ground and supports the spreader body in the tilted position shown in Figure 2 in which it has maximum liquid-retaining capacity. By inserting a pin 66 through one of the openings 58 and through the openings 59, the supporting strut is locked in position. The operator may then remove the hydraulic device by disconnecting the cylinder 50 and the piston rod 53 from their respective points of connection. The extensible stop device including the members 64 and 65 maintains the spreader in position when the strut 55 is locked to the draft structure.

As another method of operation, the spreader may be drawn through the barn or adjacent the vicinity of the material to be loaded with the supporting strut lifted as shown in Figure 3. With this method of operation, the spreader body is maintained in an inclined position in which it has maximum liquid capacity.

With either method of loading, the spreader is transported to the field where the material is to be discharged with the spreader body in the inclined position of Figure 3 and with the supporting strut folded into inoperative position. When it is desired to begin spreading the material, the hydraulic device is supplied with fluid under pressure to extend the device to the position shown in Figure 1. The cylinder is so proportioned that when its maximum position has been reached, the spreader body will be in the horizontal position of Figure 1. As the body reaches horizontal position, the link 41 actuates the bell crank 38 to move the link 36 whereby the drive chain 26 is brought into operative engagement with the sprocket 27 as shown in Figure 1, thereby putting the spreader mechanism into operation. Once the field has been reached and spreading of the material is begun, liquid retention is of no significance and there is no objection to drainage of the liquid portion to the rear of the spreader body.

It will be understood that applicant has shown and described only a preferred embodiment of his improved construction for fertilizer distributors, and that he claims as his invention all modifications falling within the scope of the appended claims.

What is claimed is:

1. A spreader adapted to be connected to and operated by a tractor comprising a wheeled body structure, said body having a bottom wall lying in a single plane, vertical side walls, and an upwardly extending wall at one end of the body to provide for holding liquid in that end portion of the body to a certain level as determined by the height of the upwardly extending wall, a conveyor extending above the bottom and upwardly over said upwardly extending wall and continuing beneath the bottom, means for driving said conveyor, a hitch structure connected to the forward end of the body on a transverse axis and extending forwardly therefrom for connection with the draw-bar of the tractor, an expansible stop means connected to said hitch structure and to a point on the spreader body, said means permitting downward tilting of the liquid retaining end of the spreader body from a material discharging position with the bottom wall horizontal to an angled liquid-holding position and to a degree of inclination determined by the stop means, and a body tilting device connected between the spreader body and the hitch structure.

2. A spreader adapted to be connected to and operated by a tractor comprising a wheeled body structure, said body having a bottom wall lying in a single plane, vertical side walls, and an upwardly extending wall at one end of the body to provide for holding liquid in that end portion of the body to a certain level as determined by the height of the upwardly extending wall, a conveyor extending above the bottom and upwardly over said upwardly extending wall and continuing beneath the bottom, means for driving said conveyor, a hitch structure connected to the forward end of the body on a transverse axis and extending forwardly therefrom for connection with the draw-bar of the tractor, an expansible stop means connected to said hitch structure and to a point on the spreader body, said means permitting downward tilting of the liquid retaining end of the spreader body from a material discharging position with the bottom wall horizontal to an angled liquid-holding position and to a degree of inclination determined by the stop means, and a two-way acting expansible hydraulic device connected between the spreader body and the hitch structure.

3. A spreader adapted to be connected to and operated by a tractor comprising a wheeled body structure, said body having a bottom wall, vertical side walls, and an upwardly extending wall at one end of the body to provide for holding liquid in that end portion of the body to a certain level as determined by the height of the upwardly extending wall, a conveyor extending above the bottom and upwardly over said upwardly extending wall and continuing beneath the bottom, means for driving said conveyor, a hitch structure connected to the forward end of the body on a transverse axis and extending forwardly therefrom for connection with the draw-bar of the tractor, an expansible stop means connected to said hitch structure and to a point on the spreader body, said means permitting downward tilting of the liquid retaining end of the spreader body from a horizontal position to a degree of inclination determined by the stop means, a body tilting device connected between the spreader body and the hitch structure, and a supporting strut connected to said device and shiftable to and from ground-engaging position thereby.

4. A spreader adapted to be connected to and operated by a tractor comprising a wheeled body structure, said body having a bottom wall, vertical side walls, an open rear end, and a forward end provided with an upwardly extending wall to provide for holding liquid in the front portion of the body to a certain level as determined by the height of the upwardly extending wall, a conveyor extending above the bottom and upwardly over said upwardly extending wall and continuing beneath the bottom, means for driving said conveyor, a hitch structure connected to the forward end of the body on a transverse axis and extending forwardly therefrom for connection with the draw-bar of a tractor, an expansible stop means connected to said hitch structure and to a point on the spreader body, said means permitting downward tilting of the front portion of the spreader body from a horizontal position to a degree of inclination determined by the stop means in which position the body has maximum liquid retaining capacity, and means connected between the spreader body and the hitch structure for tilting the body.

5. A spreader adapted to be detachably connected to and operated by a tractor comprising a wheeled body structure, said body having a bottom wall, vertical side walls, an open rear end, and a forward end provided with an upwardly extending wall to provide for holding liquid in the front portion of the body to a certain level as determined by the height of the upwardly extending wall, a conveyor extending above the bottom and upwardly over said upwardly extending wall and continuing beneath the bottom, means for driving said conveyor, a hitch structure connected to the forward end of the body on a transverse axis and extending forwardly therefrom for connection with the draw-bar of a tractor, an expansible stop means connected to said hitch structure and to a point on the spreader body, said means permitting downward tilting of the front portion of the spreader body from a horizontal position to a degree of inclination determined by the stop means in which position the body has maximum liquid retaining capacity, means connected between the spreader body and the hitch structure for tilting the body, and a power-operated supporting strut for supporting the body in said inclined liquid retaining position when removed from the tractor.

6. A spreader adapted to be connected to and operated by a tractor comprising a wheeled body structure, said body having a bottom, vertical side walls, an open rear end, and a forward end provided with an upwardly extending wall for holding liquid in the front portion of the body to a certain level as determined by the height of the upwardly extending wall, a conveyor extending above the bottom and upwardly over said upwardly extending wall and continuing beneath the bottom, means for driving said conveyor, a draft frame structure connected to the forward end of the body on a transverse axis and extending forwardly therefrom for connection with the draw-bar of a tractor, an expansible stop means connected to said draft frame structure and to a point on the spreader body, said means permitting downward tilting of the forward portion of the spreader body to a degree determined by the stop means and limiting upward tilting to a horizontal position of the portion on the body, power-operated tilting means connected between the spreader body and the draft frame, clutch means to engage and disengage the conveyor driving means, and linkage connecting said clutch means with the power-operated tilting means to engage the conveyor driving means when the spreader is tilted to bring the bottom into a horizontal position.

7. A spreader adapted to be connected to and operated by a tractor comprising a wheeled body structure, said body having a bottom wall, vertical side walls, an open rear end, and a forward end provided with an upwardly extending wall to provide for holding liquid in the front portion of the body to a certain level as determined by the height of the upwardly extending wall, a conveyor extending above the bottom and upwardly over said upwardly extending wall and continuing beneath the bottom, means for driving said conveyor, a draft frame structure connected to the forward end of the body on a transverse axis and extending forwardly therefrom for connection with the draw-bar of a tractor, an expansible stop means connected to said draft frame structure and to a point on the spreader body, said means permitting downward tilting of the forward portion of the spreader body to a degree determined by the stop means, a supporting strut pivotally connected to the forward portion of the draft frame on a transverse axis for rocking into and out of ground-engaging position, said strut having a portion engageable with the draft frame to limit movement of the strut in a folded non-operative position, a two-way acting expansible hydraulic device connected between the spreader body and a portion of said supporting strut, and means for locking the supporting strut in any one of a plurality of positions.

8. A spreader adapted to be connected to and operated by a tractor comprising a wheeled body structure, said body having a bottom, vertical side walls, an open rear end, and a forward end provided with an upwardly extending wall to provide for holding liquid in the front portion of the body to a certain level as determined by the height of the upwardly extending wall, a conveyor extending above the bottom and upwardly over said upwardly extending wall and continuing beneath the bottom, means for driving said conveyor, a draft frame structure connected to the forward end of the body on a transverse axis and extending forwardly therefrom for connection with the draw-bar of a tractor, an expansible stop means connected to said draft frame structure and to a point on the spreader body, said means limiting downward tilting of the forward portion of the spreader body to a degree determined by the stop means, a supporting strut pivotally connected to the forward portion of the draft frame on a transverse axis for rocking into and out of ground-engaging position, said strut having a portion engageable with the draft frame to limit movement of the strut in a folded non-operative position, a two-way acting expansible hydraulic device connected between the spreader body and a portion of said supporting strut, said hydraulic device being operative during the first part of its expansion stroke to rock and lift said strut to a folded non-operative position, further expansion of said device being operative to tilt the body and to bring it into a horizontal position, and means for locking the supporting strut in any one of a plurality of positions.

RUSSEL D. ACTON.

REFERENCES CITED

The following references are of record in the file of this patent:

UNITED STATES PATENTS

| Number | Name | Date |
|---|---|---|
| 951,073 | Hicks | Mar. 1, 1910 |
| 2,239,029 | Barrett | Apr. 22, 1941 |
| 2,360,125 | Griffiths | Oct. 10, 1944 |